US007361399B2

(12) United States Patent
Song et al.

(10) Patent No.: US 7,361,399 B2

(45) Date of Patent: Apr. 22, 2008

(54) GLOSS COATED MULTIFUNCTIONAL PRINTING PAPER

(75) Inventors: Jay C. Song, Highland Mills, NY (US); Sen Yang, Nanuet, NY (US)

(73) Assignee: International Paper Company, Memphis, TN (US)

( * ) Notice: Subject to any disclaimer, the term of this patent is extended or adjusted under 35 U.S.C. 154(b) by 0 days.

(21) Appl. No.: 10/852,538

(22) Filed: May 24, 2004

(65) Prior Publication Data

US 2005/0260428 A1 Nov. 24, 2005

(51) Int. Cl.
*B32B 5/16* (2006.01)
*B32B 29/04* (2006.01)

(52) U.S. Cl. ...................... 428/323; 428/327; 428/328; 428/330

(58) Field of Classification Search ..................... None
See application file for complete search history.

(56) References Cited

U.S. PATENT DOCUMENTS 4,780,356 A 10/1988 Otouma
4,892,787 A 1/1990 Kruse
5,053,268 A 10/1991 Ehara
5,124,201 A * 6/1992 Kurabayashi et al. .... 428/32.37
5,281,467 A 1/1994 Shimada
5,362,558 A * 11/1994 Sakaki et al. ............ 428/32.35
5,714,270 A 2/1998 Malhotra
5,856,001 A * 1/1999 Okumura et al. ........ 428/32.36
6,150,289 A 11/2000 Chen
6,465,082 B1 10/2002 Takezawa
6,534,156 B1 3/2003 Baker
6,632,488 B2 * 10/2003 Okumura et al. ........ 428/32.25
2003/0048344 A1 3/2003 Koga
2003/0118790 A1 * 6/2003 Ilda et al. .................. 428/195

FOREIGN PATENT DOCUMENTS

EP 1112856 7/2001
JP 04201595 7/1992

OTHER PUBLICATIONS

Database WPI, Section Ch, Week 199236, Derwent Publications Ltd., London, GB; Class A18, AN 1992-295167, XP002341396.

* cited by examiner

*Primary Examiner*—Monique R. Jackson
(74) *Attorney, Agent, or Firm*—Thomas W. Barnes, III; Richard C. Stewart, II; Evelyn M. Sommer

(57) ABSTRACT

This invention relates to paper products and/or substrates that is multifunctional and suitable for use in a wide range of office printing equipment and contains a base sheet of cellulose fibers and a pigmented composition coated on said substrate, the coating containing a first pigment having a BET surface area of from 50 to 750 $m^2/g$, a second pigment having a BET surface area of from 5 to 49 $m^2/g$, and polymeric binder; as well as methods of making and using the same.

36 Claims, 3 Drawing Sheets

Figure 1. Bristow absorption length versus clay content
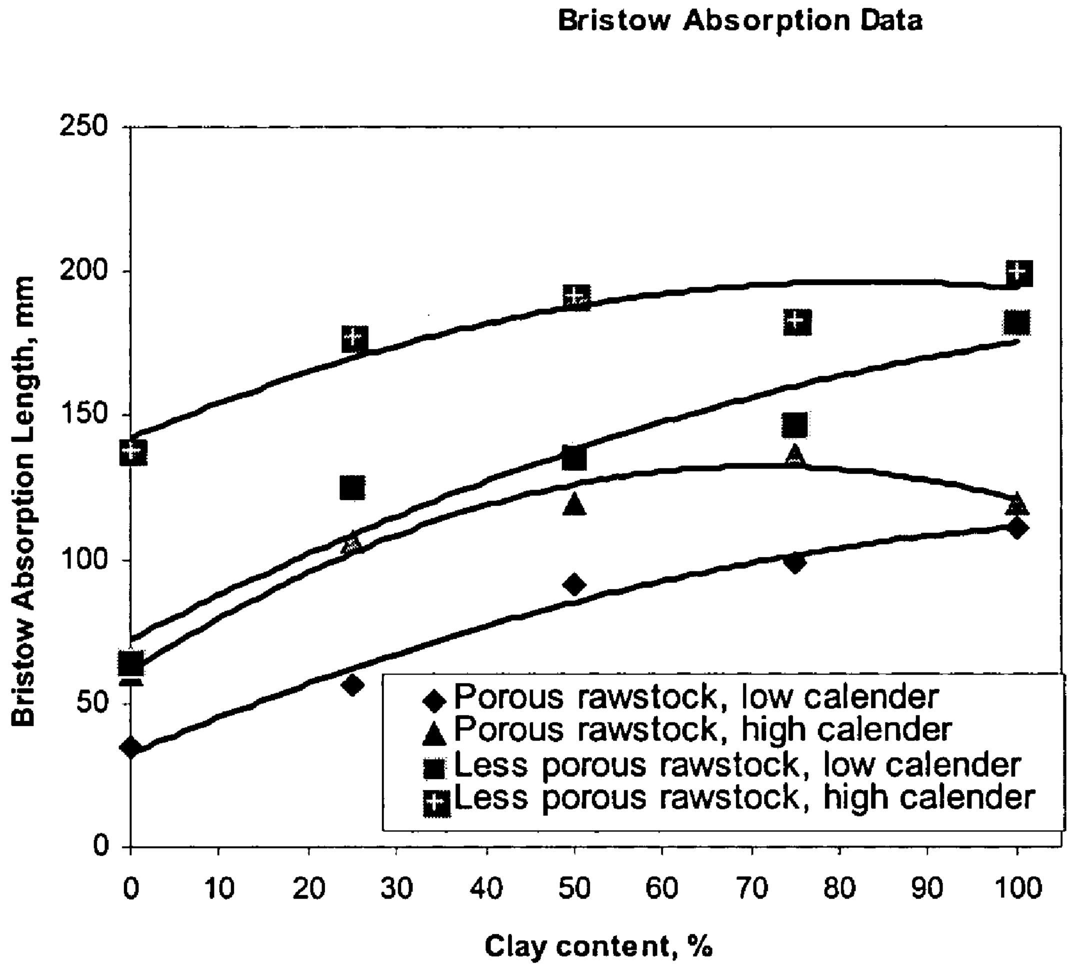

Figure 2. Print density versus Bristow absorption length
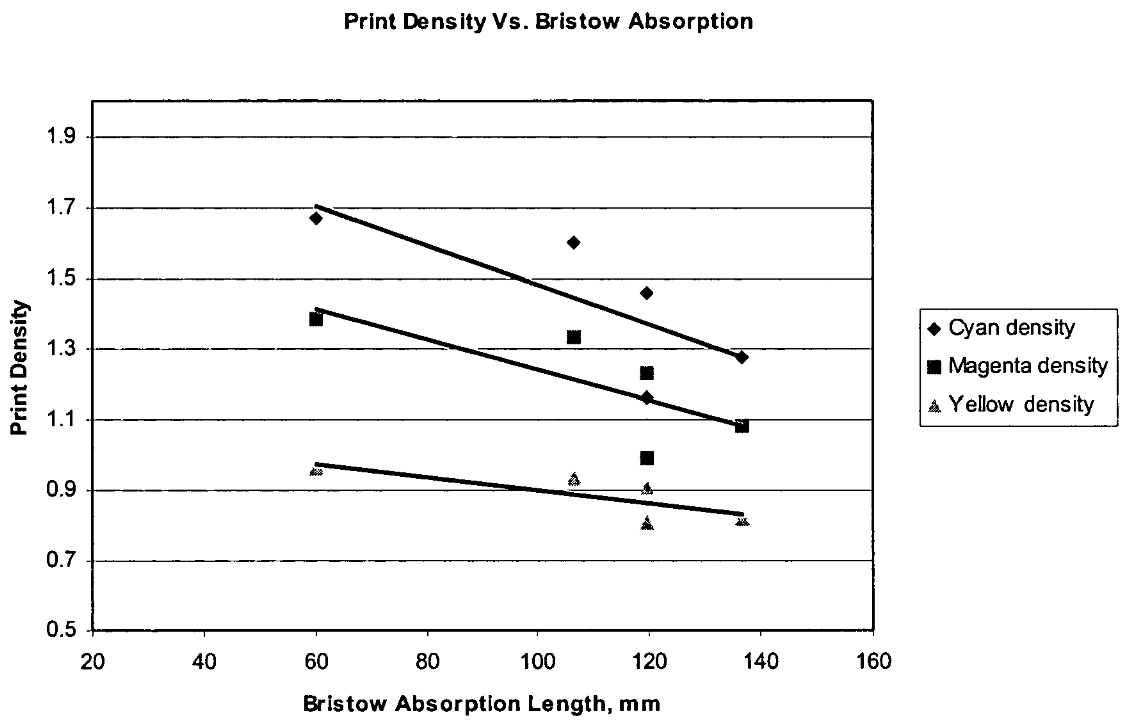

Figure 3. Gloss versus % Kaolin Clay
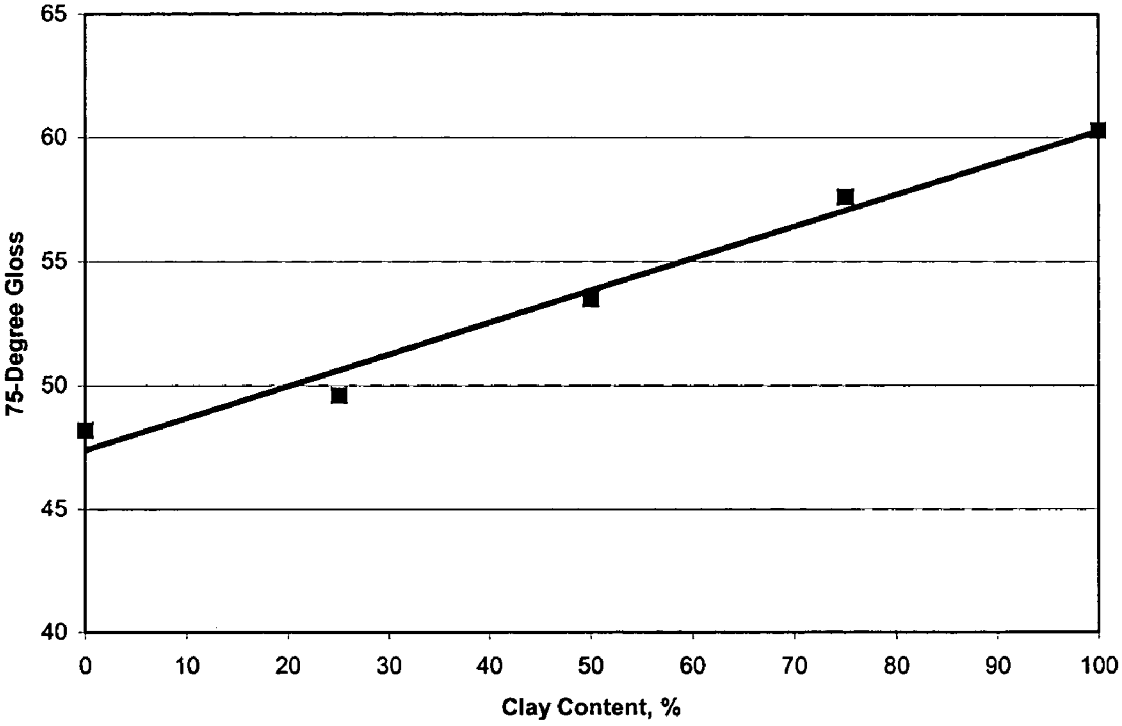

GLOSS COATED MULTIFUNCTIONAL PRINTING PAPER

BACKGROUND OF THE INVENTION

1. Field of the Invention

The present invention relates to a multifunctional paper that is suitable for use in a broad range of office printing equipment including black and white copiers, color copiers, laser printers, color laser printers, inkjet printers, liquid toner digital presses, fax machines and other printers and copiers employed in an office and the like. More particularly the invention relates to gloss coated multifunctional paper that can be used in a broad range of office printing equipment including inkjet printers, electrophotographic copiers and printers and liquid toner digital presses, having excellent ink absorption and toner adhesion properties and providing excellent image quality and reliable runnability.

2. Description of the Related Art

Digital printing has gained significant market growth in the recent years due to the advantages of on-demand printing, personalized and variable data printing, and rapid growth of digital photography. Paper industry is constantly attempting to develop new paper grades for digital printing. For example, see U.S. Pat. Nos. 4,780,356, 4,892,787, 5,053,268, 5,281,467; 5,714,270, 6,150,289, 6,465,082, and 6,534,156; and U.S. patent application Publication 2003/0048344.

SUMMARY OF THE INVENTION

One aspect of the present invention relates to a coated paper suitable for multifunctional printing, including inkjet and electrophotographic printing comprising:

a paper substrate, preferably having a Gurley Porosity equal to or less than about 60 sec/100 $cm^3$; and a pigmented composition coated on at least one surface of the substrate, said pigmented coating composition comprising (1) a first pigment having a BET surface area in the range of from about 50 to about 700 $m^2/g$, preferably in an amount of from about 40 to about 99 weight % based on the total amount of first and second pigments in the coating; (2) a second pigment having a BET surface area in the range of from about 5 to about 49 $m^2/g$, preferably in an amount of from about 1 to about 60 weight % based on the total amount of first and second pigments in the coating; and (3) a polymeric binder preferably in an amount preferably from about 5 to about 40 parts (dry basis) based on 100 parts (dry basis) of pigments present in the coating, Said coated paper having a coating gloss equal to or greater than about 30 at 75° and a Bristow Absorption length of less than about 180 mm.

Another aspect of this invention relates to a method of producing a coated paper that comprises steps of:

(a) Preparing an aqueous coating formulation comprising: (i) water, (ii) a first pigment having a BET surface area in the range of from about 50 to about 700 $m^2/g$, preferably in an amount of from about 40 to about 99 weight % based on the total amount of first and second pigments in the coating; (iii) a second pigment having a BET surface area in the range of from about 5 to about 49 $m^2/g$, preferably in an amount of from about 1 to about 60 weight % based on the total amount of first and second pigments in the coating; and (3) a polymeric binder preferably in an amount preferably from about 5 to about 40 parts (dry basis) based on 100 parts (dry basis) of pigments present in the coating;

(b) Applying the aqueous coating formulation to one or both surfaces of a paper substrate preferably having a Gurley Porosity equal to or less than about 60 sec/100 $cm^3$;

(c) Drying the coated paper; and (d) Calendaring the dried coated paper to form a form a dried calendared paper having a coating gloss equal to or greater than about 30% at 75° and a Bristow Absorption length of less than about 180 mm.

Yet another aspect of this invention relates to a method of generating images on a surface of a coated paper in an inkjet or electrophotographic printing apparatus that comprises:

(a) Incorporating the coated paper of this invention into said apparatus; and (b) Forming an image on a surface of said coated paper to form a coated paper having an image on a surface thereof.

The coated paper of the present invention exhibits one or more advantages. For example, the paper of this invention is suitable for multifunctional printing, including inkjet and electrophotographic printing.

BRIEF DESCRIPTION OF THE DRAWINGS

The above and other aspects and advantages of the invention will now be further described in conjunction with the accompanying drawings in which:

FIG. 1 is a graph of Bristow Absorption length (mm) versus weight percent of second pigment based on the total dry weight of first and second pigments in the coating for various coated papers of this invention.

FIG. 2 is a graph of print density versus Bristow Absorption length (mm) for various papers of this invention.

FIG. 3 is a graph of paper gloss versus weight percent of second pigment based on the total dry weight of first and second pigments in the coating for various coated papers of this invention.

DETAILED DESCRIPTION OF THE INVENTION

One aspect of this invention relates to a coated paper suitable for multifunctional printing, including inkjet and electrophotographic printing. The coated paper comprises a paper substrate coated on at least one side with a pigmented coating composition comprising 1) a first pigment having a BET surface area in the range of from about 50 to about 700 square meters per gram; (2) a second pigment having a BET surface area in the range of from about 5 to about 49 square meters per gram; and (3) a polymeric binder.

Usually, the coated paper of this invention has a coating gloss equal to or greater than about 30% at 75° measured by TAPPI test method T480 om-92. This method measures the specular gloss of the paper at 75 degree from the plane of the paper. In the preferred embodiments of the invention, the coating gloss equal to or greater than about 35% at 75°. In the more preferred embodiments of the invention, the coating gloss at 75° is from about 35% to about 75% and in the most preferred embodiments of the invention is from about 40% to about 65% at 75°.

Usually, the coated paper of this invention exhibits a Bristow Absorption length of less than about 180 mm that is measured using the Bristow Absorption Tester. In the Tester, Test Strips of the coated paper are mounted on a rotating wheel that is moving at a constant speed of 800 msec/mm for the coated paper across a headbox containing the test ink. The Bristow ink solution is a 10% isopropyl alcohol in water with 0.05% of Safranin dye. Ink (25 microliters) is pipetted into the headbox opening. The ink trace length was measured. In the preferred embodiments of the invention, the Bristow Absorption length of the coated paper is less than about 170 mm. In the more preferred embodiments of the invention, the Bristow Absorption length the coated paper is less than about 160 mm and in the most preferred embodiments of the invention, the Bristow Absorption length of the coated paper is less than about 150 mm.

The coated paper of this invention preferably has a Gurley Porosity equal to or less than about 5,000 sec/100 cm3 as measured by the procedure of TAPPI T460 om-88. The Gurley porosity of the coated paper for multifunctional printing is preferably from about 50 sec/100 ml to about 4,000 sec/100 cm3. In the preferred embodiments of this invention, the coated paper has Gurley porosity preferably from about 50 sec/100 cm3 to about 3,000 sec/100 cm3. The Gurley porosity of the coated paper is more preferably from about 50 s sec/100 cm3 to about 2,500 sec/100 cm3 and most preferably from about 50 sec/100 cm3 to about 2,000 sec/100 cm3.

The coated paper of this invention preferably has a smoothness of less than 3.0 as measured using TAPPI test method for Parker Print Surface: T555 om-99. In the preferred embodiments of this invention, the coated paper has Parker Print Surface preferably from about 0.80 to about 2.5. The Parker Print Surface is more preferably from about 0.90 to about 2.25 and most preferably from about 0.90 to about 2.0.

The coated paper of this invention preferably has an opacity of greater than 93% as measured using TAPPI test method T425 om-91. In the preferred embodiments of this invention, the coated paper has opacity preferably from about 90% to about 99%. The opacity is more preferably from about 92% to about 99% and most preferably from about 94% to about 99%.

The brightness of the coated paper is preferably from about 88% brightness to about 99% GE brightness as measured using TAPPI test method T452 om 92. The brightness is more preferably from about 89% brightness to about 99% GE brightness and most preferably from about 90% brightness to about 99% GE brightness.

The first essential component of the coated paper of this invention is a paper substrate, preferably having Gurley Porosity equal to or less than about 60 sec/100 $cm^3$ as measured by the procedure of TAPPI T460 om-88. Any conventional paper or paperboard substrate can be used in the practice of this invention provided that it has the required Gurley Porosity. The paper substrate preferably should have an adequate porosity to aid the absorption and drying process of the inkjet inks. However, if the porosity is too high, ink bleed through and show through can occur which are not desirable. So the porosity level is preferably controlled to obtain the desired ink absorption and ink bleed through. The Gurley porosity of the base substrate is preferably from about 1 sec/100 ml to about 70 sec/100 $cm^3$. In the preferred embodiments of this invention, the substrate has Gurley porosity preferably from about 1 sec/100 $cm^3$ to about 50 sec/100 $cm^3$. The Gurley porosity is more preferably from about 1 sec/100 $cm^3$ to about 45 sec/100 $cm^3$ and most preferably from about 1 sec/100 $cm^3$ to about 30 sec/100 $cm^3$.

The substrate preferably exhibits a Bristow Absorption length of less than about 40 mm that is measured using the Bristow Absorption Tester and procedure described above except that test strips of the substrate are mounted on the rotating wheel is moved at a constant speed of 200 msec/mm for the paper substrate across a headbox containing the test ink. In the preferred embodiments of the invention, the Bristow Absorption length of the paper substrate is less than about 35 mm. In the more preferred embodiments of the invention, the Bristow Absorption length the paper substrate is less than about 30 mm and in the most preferred embodiments of the invention, the Bristow Absorption length of the paper substrate is less than about 20 mm.

The paper substrate preferably has a surface resistivity that provides the desired feeding reliability and image quality of the coated paper in electrophotographic printing systems. The surface resistivity is generally from about $1\times10^{9}$ to about $1\times10^{13}$ ohms/square as is measured using a Resistivity meter manufactured by Keithley Instruments, Inc. preferably from about $1\times10^{10}$ to about b $\mathbf{1\times10}^{13}$ ohms/square and more preferably from about $5\times10^{10}$ to about $1\times10^{12}$ ohms/square.

The basis weight of the substrate may vary widely and conventional basis weights may be employed depending on the application and paper machine capability. Preferably, the substrate basis weight is from about 45 to about 280 $g/m^2$, although substrate basis weight can be outside of this range if desired. The basis weight is more preferably from about 75 to about 250 $g/m^2$ and most preferably from about 90 to about 230 $g/m^2$.

For high brightness coated paper grades, it is desirable to use a paper substrate with adequate paper brightness. The GE brightness of the base paper can vary widely and any conventional level of brightness can be used. The brightness of the substrate is preferably from about 84% brightness to about 98% GE brightness as measured using TAPPI test method T452 om 92, more preferably from about 87% brightness to about 96% GE brightness and most preferably from about 88% brightness to about 96% GE brightness.

The caliper of the paper substrate can vary widely and paper having conventional calipers can be used. Caliper is preferably from about 3 mil to about 12 mil. The more preferred caliper range is from about 4 mil to about 10 mil.

In the preferred embodiments of the invention a relatively smooth paper substrate is used which helps develop sheet gloss and improve coating uniformity. The preferred range for smoothness of the paper substrate is equal to or less than about 250 Sheffield units as is measured by the procedure of TAPPI test method T5380m-1. The more preferred smoothness of the paper substrate is equal to or less than about 200 Sheffield units and is most preferably from about 30 to about 200 Sheffield units.

Useful paper substrates having the desired Gurley Porosity and methods and apparatus for their manufacture are well known in the art. See for example "Handbook For Pulp & Paper Technologies", $2^{nd}$ Edition, G. A. Smook, Angus Wilde Publications (1992) and references cited therein. For example, the paper and paperboard substrate can made from pulp fibers derived from hardwood trees, softwood trees, or a combination of hardwood and softwood trees prepared for use in a papermaking furnish by any known suitable digestion, refining, and bleaching operations as for example known mechanical, thermo mechanical, chemical and semi chemical, etc., pulping and other well known pulping processes. In certain embodiments, at least a portion of 3 he pulp fibers may be provided from non-woody herbaceous plants including, but not limited to, kenaf, hemp, jute, flax, sisal, or abaca although legal restrictions and other considerations may make the utilization of hemp and other fiber sources impractical or impossible. Either bleached or unbleached pulp fiber may be utilized in the process of this invention. Recycled pulp fibers are also suitable for use.

The substrate may also include other conventional additives such as, for example, starch, mineral fillers, sizing agents, retention aids, and strengthening polymers. Among the fillers that may be used are organic and inorganic pigments such as, by way of example, polymeric particles such as polystyrene latexes and polymethylmethacrylate, and minerals such as calcium carbonate, kaolin, and talc and expanded and expandable micro spheres. Other conventional additives include, but are not restricted to, wet strength resins, internal sizes, dry strength resins, alum, fillers, pigments and dyes.

As a second essential component, the paper of this invention comprises a coating on at least one side of the paper substrate. The weight of the coating on the surface of a substrate may vary widely and any conventional coat weight can be used. In general, the coat weight is at least about 3 $g/m^2$ of recording sheet. The coat weight is preferably from about 3 $g/m^2$ to about 15 $g/m^2$ per side, more preferably from about 4 $g/m^2$ to about 12 $g/m^2$ per side and most preferably from about 5 $g/m^2$ to about 12 $g/m^2$ per side.

Essential components of the coating comprises a first pigment having a BET surface area in the range of from about 50 to about 700 $m^2/g$ and a second pigments with a BET surface area in the range of from about 5 to less than 50 $m^2/g$. In the preferred embodiments of the invention, the first pigment has a BET surface area in the range of from about 60 to about 650 $m^2/g$ and the second pigment has a BET surface area in the range of from about 6 to about 45 $m^2/g$. In the more preferred embodiments of the invention, the first pigment has a BET surface area in the range of from about 70 to about 650 $m^2/g$ and the second pigment has a BET surface area in the range of from about 6 to about 40 $m^2/g$. In the most preferred embodiments of the invention, the first pigment has a BET surface area in the range of from about 80 to about 650 $m^2/g$ and the second pigment has a BET surface area in the range of from about 6 to about 35 $m^2/g$.

Materials for use as first pigment are described in "Handbook of Imaging Materials" $2^{nd}$ Ed, Edited by Diamond A. S and Weis, D. S, published by Dekker, NY, N.Y. (2001) having the required BET. Illustrative of useful first pigments useful for the multifunctional coated printing paper are those having the required BET and composed for example of silica, alumina sol, silica sol, alumina, zeolites, fine (sub micron) particles of precipitated calcium carbonate such as JETCOAT sold by Specialty Minerals Inc., fine (sub micron) particles of kaolin clays including Digitex sold by Engelhard and Kaojet specialty Kaolin clays sold by sold by Thiele Kaolin Company, and synthetic clays such as Laponite from Southern Clay Products, mixed oxides of aluminum and silicon, and calcium silicate fine powders. Preferred first pigments are those having the required BET and selected from the group consisting of silica, alumina sol, silica sol, alumina, zeolites, fine (sub micron) particles of precipitated calcium carbonate, fine (sub micron) particles of kaolin clays, synthetic clays and mixed oxides of aluminum and silicon and calcium silicate fine powders. More preferred first pigments are those having the required BET and selected from the group consisting of silica, alumina sol, fine (sub micron) particles of precipitated calcium carbonate and fine (sub micron) particles of kaolin clays and most preferred first pigments are those having the required BET and selected from the group consisting of silica, alumina sol and fine (sub micron) particles of precipitated calcium carbonate, and fine (sub micron) particles of kaolin clays.

Materials for use as second pigment are described in "Pigment Coating and Surface Sizing of Paper", edited by Lehtinen, Esa, published by Fapet Oy, Helsinki, Finland (2000). Illustrative of useful second pigments for the multifunctional coated printing paper are those having the required BET and composed for example from ground calcium carbonates, precipitated calcium carbonates, kaolin clays, calcined clays, titanium dioxide, plastic pigments, aluminum trihydrates, talc and polymeric beads as for example polymethylmethacrylate beads. Preferred second pigments are those having the required BET and selected from the group consisting of ground calcium carbonates, precipitated calcium carbonates, kaolin clays, calcined clays, titanium dioxide, plastic pigments, aluminum trihydrates, talc, polytetrafluoroethylene, polyethylene, polypropylene, wax particles, and polymethylmethacrylate beads. More preferred first pigments are those having the required BET and selected from the group consisting of ground calcium carbonates, precipitated calcium carbonates, kaolin clays, calcined clays, titanium dioxide, plastic pigments, and aluminum trihydrates. And most preferred first pigments are those having the required BET and selected from the group consisting of ground calcium carbonates, precipitated calcium carbonates, kaolin clays, calcined clays, plastic pigments, and aluminum trihydrates.

Useful first and second pigments can be obtained from commercial sources or mined from naturally occurring deposits and engineered for the required BET. For example, useful precipitated calcium carbonate first pigments having the required BET can be obtained commercially from Special Minerals Inc. under the trade names JETCOAT. Useful fine specialty Kaolin clays having the required BET can be obtained from Engelhard Corporation under the trade name of DIGITEX and from Thiele Kaolin Company under the trade name of KAOJET. Useful second Kaolin clay, calcined Kaolin clay and precipitated calcium carbonate pigments having the required BET can be obtained can be obtained commercially from IMERYS under the trade names of ASTRACOTE, ALPHATEX, OPTICALPRINT, respectively. Useful ground calcium carbonate having the required BET can be obtained from OMYA under the trade name of Covercarb and useful calcined Kaolin clay having the required BET can be obtained from the Engelhard under the trade name of ANSILEX. Useful hollow sphere plastic pigments having the required BET can be obtained from Dow Chemical under the trade names of DOW Plastic Pigment HS 3000 and DOW Plastic Pigment HS 2000 and from Rhom Haas under the trade name of Ropague.

The amount of the first and second pigments may vary widely provided that the desired coating gloss and Bristow Absorption length are obtained. Preferably, the amount of the first pigment is from about 40 to about 99 weight % based on the total amount of first and second pigment in the coating and the amount of second pigment is from about 1 to about 60 weight % based on the total amount of first and second pigment in the coating. More preferably, the amount of the first pigment is from about 50 to about 98 weight % based on the total amount of first and second pigment in the coating and the amount of second pigment is from about 2 to about 50 weight % based on the total amount of first and second pigment in the coating. Most preferably, the amount of the first pigment is from about 50 to about 90 weight % based on the total amount of first and second pigment in the coating and the amount of second pigment is from about 10 to about 50 weight % based on the total amount of first and second pigment in the coating.

As another essential component, the coating comprises a polymeric binder. Illustrative of useful are those which are conventionally used in coated papers as for example styrene butadiene rubber latex, styrene acrylate, polyvinyl alcohol and copolymers, polyvinyl acetates and copolymers, vinyl acetate copolymers, carboxylated SBR latex, styrene acrylate copolymers, styrene/butadiene/acrylonitrile, styrene/butadiene/acrylate/acrylonitrile polyvinyl pyrrolidone and copolymers, polyethylene oxide, poly(2-ethyl-2-oxazoline, polyester resins, gelatins, casein, alginate, cellulose derivatives, acrylic vinyl polymers, soy protein polymer, hydroxymethyl cellulose, hydroxypropyl cellulose, starches, ethoxylated, oxidized and enzyme converted starches, cationic starches, water soluble gums and the like. mixtures of water soluble and water-insoluble resins or polymer latex may be used. Preferred first polymeric binders are carboxylated SBR latexes, polyvinyl alcohol, styrene/butadiene copolymer, styrene/acrylate copolymer, and vinyl acetate polymers and copolymers.

Useful polymeric binders can be obtained from commercial sources or prepared using known preparative techniques. For example, useful styrene/butadiene and styrene/acrylate emulsion binders can be obtained commercially from DOW Chemicals under the trade names of DOW Latex; useful styrene/butadiene/acrylonitrile copolymer and acrylic ester copolymer binders can be obtained commercially from BASF Corporation under the trade names of STYRONAL and ACRONAL, respectively; useful vinyl acetate/ethylene emulsion binders can be obtained commercially from AIR PRODUCTS under the trade names of AIRFLEX and AIRVOL respectively; useful polyvinyl alcohol binder can be obtained commercially from CELANESE under the trade names of CELVOL and useful polyvinyl pyrrolidone and derivatives useful as binders can be obtained commercially from ISP, Inc. under the trade name of VIVIPRINT.

The amount of the polymeric binder-may vary widely provided that the desired coating gloss and Bristow Absorption length are obtained. The relative amounts of pigments and polymeric binder are preferably optimized for best overall print quality and toner adhesion. When the binder concentration is too high, the excessive binder would fill in the interstitial pores which would inhibits the absorption of inks. When the binder concentration is too low, coating adhesion and toner adhesion may be inadequate. Preferably, the amount of the polymeric binder is from about 5 to about 40 parts based on 100 parts of pigments in the coating where all parts are on a dry weight basis. More preferably, the amount of the polymeric binder is from about 5 to about 40 parts based on 100 parts of pigments in the coating.

In the preferred embodiments, coating composition further comprises a lubricant, preferably in an amount of from about 0.5 to about 2 parts based on 100 parts of pigments in the coating where all parts are on a dry weight basis. Useful lubricants include calcium stearate, wax emulsions, paraffin waxes, polyethylene waxes, soy lecithin/oleic acids blends, polyethylene glycol and polypropylene glycol and can be obtained from commercial sources. For example, useful calcuim stearate lubricants can be obtained commercially from OMNOVA under the trade names of SUNCOTE 450 and SUNCOTE 451.

In the preferred embodiments, cationic resins are included in the coating composition to facilitate fixing of inkjet prints and improve water resistance. Useful cationic resins include polydiallyl dimethyl ammonium chloride, polyvinyl benzyl trimethyl ammonium chloride, polymethacryloxyethylhydroxyethyldiammonium chloride, polyvinyl amine, quaternary ammonium polymers, cationic polyethylene imines, copolymers of diallyldimethyl ammonium chloride (DADMAC), copolymers of vinyl pyrrolidone with quaternized diethylaminoethylmethacrylate (DEAMEMA), cationic polyurethane latex, cationic polyvinyl alcohol, polyalkylamine dicyandiamide copolymers, amine glycidyl addition polymers, and poly [oxethylene(dimethyliminio)ethylene (dimethyliminio)ethylene] dichlorides. Useful cationic resins can be obtained from commercial sources or prepared using known preparative techniques. For example, useful DADMAC cationic resins can be obtained commercially from Calgon Corporation under the trade names of Calgon 261 LV, Calgon 261 RV and Calgon 7091 and from by GAC Specialty Chemicals under the trade name of GENFLOC.

In addition to the required essential components, the coating may include other ingredients typically applied to the surface of a recording sheet in conventional amounts. Such optional components include dispersants, optical brightener, UV absorbers, coating rheology modifiers, surfactants, thickeners, deforming agents, crosslinking agents, preservatives, pH control agents, cast coating releasing agents, and the like. Examples of brightening agents include sodium salts of derivatives of bis(triazinylamino)stilbene such as Tinopal from Ciba Specialty Chemicals and Lucophore from Clariant Corporation. Thickeners including acrylic copolymers, polyvinyl pyrrolidone and derivatives, acrylamide-sodium acrylate copolymers, polysaccharides and associative thickeners such as hydroxylated ethoxylated urethanes, hydrophobic alkali-swellable emulsions, and associative cellulosic thickeners.

The coated ink jet recording sheet of this invention can be prepared using known conventional techniques. Methods and apparatuses for forming and applying a coating formulation to a paper substrate are well known in the paper and paperboard art. See for example, G. A. Smook referenced above and references cited therein all of which is hereby incorporated by reference. All such known methods can be used in the practice of this invention and will not be described in detail. For example, the mixture of essential pigments, polymeric or copolymeric binders and optional components can be dissolved or dispersed in an appropriate liquid medium, preferably water, and can be applied to the substrate by any suitable technique, such cast coating, Blade coating, air knife coating, rod coating, roll coating, gravure coating, slot-die coating, spray coating, dip coating, Meyer rod coating, reverse roll coating, extrusion coating or the like. In addition, the coating compositions can also be applied at the size press of a paper machine using rod metering or other metering techniques.

The coated paper or paperboard substrate is dried after treatment with the coating composition. Methods and apparatuses for drying paper or paperboard webs treated with a coating composition are well known in the paper and paperboard art. See for example G. A. Smook referenced above and references cited therein. Any conventional drying method and apparatus can be used. Consequently, these methods and apparatuses will not be described herein in any great detail. Preferably after drying the paper or paperboard web will have moisture content equal to or less than about 10% by weight. The amount of moisture in the dried paper or paperboard web is more preferably from about 5 to about 10% by weight.

After drying the paper or paperboard substrate may be subjected to one or more post drying steps as for example those described in G. A. Smook referenced above and references cited therein. For example, the paper or paperboard web may be calendared improve the smoothness and other properties of the paper as for example by passing the coated paper through a nip formed by a calendar roll having a temperature of about 150 to about 300° F. and a pressure of about 1000 to about 2000 pounds per linear inch.

The coated paper of the present invention can be employed in inkjet and electrophotographic printing processes. One embodiment of the present invention is directed to a method of generating images on a surface of a coated paper in an inkjet and electrophotographic printing apparatus that comprises:

(a) Incorporating the coated paper of this invention into said apparatus; and (b) Forming an image on a surface of said coated paper to form a coated paper having an image on a surface thereof. Inkjet and electrophotographic printing and apparatuses are well known in the art and will not be described in any great detail. See for example, Handbook of Imaging Materials, supra., the disclosures of which are totally incorporated herein by reference.

Images printed onto the coated paper of this invention using inkjet and electrophotographic printing exhibit acceptable print density, toner adhesion and/or wicking. Print density is determined by printing a series of solid black, cyan, magenta and yellow images on a coated surface of the coated paper with an inkjet and/or electrophotographic printer in plain paper standard mode and measuring the print density spectrophotometrically using an X-Rite Densitometer 603. Toner adhesion is determined by comparing the print densities of an image printed on a coated surface of the coated paper before and after a tape-pull using 3M Scotch Magic Tape 810 or similar tape which has been rolled once with a 4.5 lb. roller and calculating the percent retention of print density after tape pulling. Wicking is determined by printing two parallel solid bars on the surface of a coated surface of the coated paper various distances apart and examining the printed bars under an optical microscope to determine the minimum distances between the bars before the edges of the bars begin to touch. The print density is preferably equal to or greater than about 0.8 for color images and equal to or greater than about 1.0 for black image, more preferably equal to or greater than about 0.9 for color images and equal to or greater than about 1.1 for black image and most preferably is equal to or greater than about 1.0 for color images and equal to or greater than about 1.2 for black image. The toner adhesion is preferably equal to or greater than about 85%, more preferably is equal to or greater than about 90% , most preferably is equal to or greater than about 95% and is equal to or greater than about 99% in the embodiments of choice. The wicking is preferably equal to or less than about 0.4 mil, more preferably equal to or less than about 0.2 mil and most preferably is equal to or less than about 0.1 mil.

The present invention will be described with references to the following examples. The examples are intended to be illustrative and the invention is not limited to the materials, conditions, or process parameters set forth in the example. Unless otherwise indicated, the amounts are in parts per hundred (pph).

EXAMPLE 1

An aqueous slurry of fine precipitated calcium carbonate was added to a high shear mixer. Kaolin clay is then added under proper shear actions. After obtaining uniform pigment slurry, styrene butadiene acrylonitrile emulsion, polyvinyl alcohol, calcium stearate and Optical brightening agent are added to the coating in that order under shear. The resulting coating formulations and their characteristics are set forth in the following Table I.

TABLE I

| | 1 | 2 | 3 | 4 | 5 |
|---|---|---|---|---|---|
| FPCC Pigment(1) | 100 | 75 | 50 | 25 | — |
| Kaolin Clay Pigment(2) | — | 25 | 50 | 75 | 100 |
| SBA Binder(3) | 8 | 8 | 8 | 8 | 8 |
| PVA Binder(4) | 3 | 3 | 3 | 3 | 3 |
| Lubricant(5) | 1 | 1 | 1 | 1 | 1 |
| Optical Brightening Agent(6) | 1 | 1 | 1 | 1 | 1 |
| % Solids | 36.5 | 41 | 41 | 41 | 55 |

(1)Fine precipitated calcium carbonate having a BET of 60 to 100 $m^2/g$ from Specialty Minerals Inc. Bethlehem, PA 18017 under the trade name JETCOAT 30.
(2)Kaolin clay having a BET of less than 10 from Imerys, Roswell, GA 30076 under the trade name Astracote 90.
(3)Styrene/Butadiene/Acrylonitrile Emulsion from Dow Chemical Company, Midland, Michigan 48674 under the trade name Dow Latex 31301.NA
(4)Polyvinyl alcohol from Celanese under the trade name Celvol.
(5)Calcium Stearate from Omnova under the trade name Suncote 450.
(6)Sodium salts of derivatives of bis(triazinylamino)stilbene from Ciba Specialty Chemicals under the trade name Tinopal.

The five coating formulations were applied onto a 90-gsm low-porosity base paper having a Gurley Porosity of 60 sec/100 $cm^3$ using a drawdown rod. The coat weight range was 8-10 gsm. The coated paper sheets were calendered using a lab calender at the following two conditions with different calendering intensity. The first calendering condition (higher calender intensity) was 1,000 psi, 150° F., and 9 feet/minute (fpm). The second calendering condition (lower calender intensity) was 150 psi, 72° F. and 9 fpm. The five coating formulations were also applied onto a 90-gsm high-porosity base paper having a Gurley Porosity of 30 sec/100 $cm^3$using a drawdown rod. The coat weight range was 8-10 gsm. The coated paper sheets were calendered using a lab calender at the following two conditions with different calendering intensity. The first calendering condition (higher calender intensity) was 1,000 psi, 150° F., and 9 fpm. The second calendering condition (lower calender intensity) was 150 psi, 72° F. and 9 fpm.

The Bristow Absorption length of the substrate and the coated paper were determined using the procedure described above. The coated papers were printed with a series of black, cyan, magenta and yellow solid block images using a Canon I470D inkjet printer and the print density measured spectrophotometrically using an X-Rite Densitometer. The results are set forth in FIG. 1 in which the Bristow absorption length is plotted as a function of Kaolin clay content and in FIG. 2 in which the print density is plotted as a function of Bristow absorption length.

EXAMPLE 2

Using the procedure of Example 1, a coating composition was prepared according to the formulation set forth in the following Table II.

TABLE II

| | |
|---|---|
| FPCC Pigment(1) | 70 parts |
| PCC Pigment(2) | 20 parts |
| HSP Pigment(3) | 10 parts |
| VAE Emulsion Binder(4) | 9 parts |
| PVA Binder(5) | 1 part |
| Ethylated Starch(6) | 9 parts |
| PDAC Cationic Resin(7) | 3 parts |
| Lubricant(8) | 1 part |
| Optical Brightening Agent(9) | 2 parts |

TABLE II-continued

| | |
|---|---|
| Defoamer[10] | 0.2 part |
| Thickener[11] | 0.6 part |

[1]As defined in Example 1.
[2]Precipitated calcium carbonate having a BET of less than 30 $m^2/g$ obtained from by Specialty Minerals Inc. Bethlehem, PA 18017 under the trade name Multifex.
[3]Hollow sphere plastic pigment obtained from Dow Chemical Company, Midland, Michigan 48674 under the trade name Dow PP HS 3000.
[4]Vinyl acetate/ethylene copolymer emulsion obtained from Air Products and Chemicals, Inc., Allentown, PA 18195 under the trade name Airflex 410.
[5]As defined in Example 1.
[6]Ethylated Starch obtained from Staley under the trade name Ethylex.
[7]Poly(diallyldimethylammonium chloride cationic resin obtained from GAC Specialty Chemicals, Holland, Ohio 43528 under the trade name Genfloc 71100
[8]As defined in Example 1.
[9]As defined in Example 1.
[10]Silicone based defoamer obtained from Ashland Chemical under the tradename Drew Plus L470.
[11]Acrylic copolymer emulsion thickener obtained from BASF under the tradename Sterocoll.

The coating formulation was applied to a 90 gsm base paper having a Gurley Porosity of 60 sec/100 $cm^3$ using a pilot blade coater. Both sides of the paper were coated with a coat weight of 6 gsm per side. The coated paper was super-calendered at the following conditions:

Temperature: 93° C.

Calender load: 248-304 kN/m

Number of nips used: 5

Speed: 1,800 feet per minute

The physical properties of the coated and super-calendered papers as determined by the procedures of Example 2 are set forth in the following Table III.

TABLE III

| | |
|---|---|
| Basis weight, gsm | 108 |
| Caliper, mil | 4.01 |
| GE Brightness, % | 92.9/93.0 |
| 75 degree gloss, %, felt/wire | 52/50 |
| Opacity, % | 89.1 |
| Gurley porosity, sec/100 $cm^3$ | 1,058 |
| Parker smoothness, felt/wire | 1.63/1.38 |
| Bristow absorption length, mm | 111 |

The smoothness was measured using TAPPI test method for Parker Print Surface: T555 om-99. The opacity property was measured using TAPPI test method T425 om-91. The GE brightness, gloss, Gurley porosity and Bristow absorption length where determined using the methods described below.

EXAMPLE 3

Using the procedure of Example 1, a coating composition was prepared according to the formulation set forth in the following Table IV.

TABLE IV

| | |
|---|---|
| FPCC Pigment | 75 parts |
| PCC Pigment | 20 parts |
| HSP Pigment | 5 parts |
| VAE Emulsion Binder | 9 parts |
| PVA Binder | 1 part |
| Ethylated Starch | 4 parts |
| PDAC Cationic Resin | 3 parts |
| Lubricant | 1 part |
| Optical Brightening Agent | 2 parts |
| Defoamer | 0.2 part |
| Thickener | 0.6 part |

In Table IV, all of the abbreviations are as defined in Example 2.

The coating color was applied to a 90 gsm base paper using a pilot blade coater. Both sides of the paper were coated with a coat weight of 6 gsm per side. The coated roll was super-calendered at the following conditions:

Temperature: 93° C.

Calender load: 248-304 kN/m)

Number of nips used: 5

Speed: 1,800 feet per minute

The physical properties of the coated and super-calendered papers that was determined using the procedures of Example 2 as set in the following Table V.

TABLE V

| | |
|---|---|
| Basis weight, gsm | 108 |
| Caliper, mil | 4.03 |
| GE Brightness, % | 92.8/93.1 |
| 75 degree gloss, %, felt/wire | 52.8/51.5 |
| Opacity, % | 89.6 |
| Gurley porosity, sec/100 $cm^3$ | 1,074 |
| Parker smoothness, felt/wire | 1.56/1.44 |
| Bristow absorption length, mm | 100 |

EXAMPLE 4

Using the procedure of Example 1, a coating composition was prepared according to the formulation set forth in the following Table VI.

TABLE VI

| | |
|---|---|
| FPCC Pigment | 90 parts |
| HSP Pigment | 10 parts |
| VAE Emulsion Binder | 9 parts |
| PVA Binder | 1 part |
| Ethylated starch | 9 parts |
| PDAC Cationic Resin | 3 parts |
| Lubricant | 1 part |
| Optical Brightening Agent | 2 parts |
| Defoamer | 0.2 part |
| Thickener | 1.0 part |

In Table VI all of the abbreviations are as defined in Example 2.

The coating color was applied to a 90 gsm base paper having a Gurley Porosity of 60 sec/100 $cm^3$ using a pilot blade coater. Both sides of the paper were coated with a coat weight of 6 gsm per side. The coated roll was super-calendered at the following conditions:

Temperature: 93° C.

Calender load: 248-304 kN/m

Number of nips used: 5

Speed: 1,800 feet per minute

The physical properties of the coated and super-calendered paper as determined by the procedures of Example 2 are set forth in the following Table VII.

TABLE VII

| | |
|---|---|
| Basis weight, gsm | 109 |
| Caliper, mil | 4.04 |
| GE Brightness, % | 92.8/92.8 |
| 75-degree gloss, %, felt/wire | 47/46.2 |
| Opacity, % | 89.6 |
| Gurley porosity, sec/100 $cm^3$ | 994 |
| Parker smoothness, felt/wire | 1.76/1.44 |
| Bristow absorption length, mm | 106 |

EXAMPLE 5

Using the procedure of Example 1, a coating composition was prepared according to the formulation set forth in the following Table VIII.

TABLE VIII

| | |
|---|---|
| FPCC Pigment | 75 parts |
| GCC Pigment[(1)] | 20 parts |
| HSP Pigment | 5 parts |
| SBA Emulsion Binder[(2)] | 12 parts |
| PVA Binder | 1 part |
| Ethylated starch | 3 parts |
| Lubricant | 1 part |
| Optical Brightening Agent | 2 parts |
| Defoamer | 0.2 part |
| Thickener | 0.3 part |

In Table VIII, "GCC Pigment" is ground calcium carbonate obtained from Omya under the tradename Covercarb, "SBA Emulsion Binder" is a styrene/butadiene/acrylonitrile emulsion obtained from Dow Chemical under the tradename Dow Latex 31301 and all the other abbreviations are as defined in Example 2.

The coating composition was applied to a 105 gsm base paper having a Gurley Porosity of 40 sec/100 cm3 using a pilot blade coater. Both sides of the paper were coated with a coat weight of 6 gsm per side. The coated roll was super-calendered at the following conditions:

Temperature: 93° C.

Calender load: 248-304 kN/m

Number of nips used: 5

Speed: 1,800 feet per minute

The physical properties of the coated and super-calendered paper as determined by the procedures of Example 2 are set forth in Table IX.

TABLE IX

| | |
|---|---|
| Basis weight, gsm | 122 |
| Caliper, mil | 4.48 |
| GE Brightness, % | 94.7/94.7 |
| 75 degree gloss, %, felt/wire | 57.4/62.6 |
| Opacity, % | 93.8 |
| Gurley porosity, sec/100 $cm^3$ | 500 |
| Parker smoothness, felt/wire | 1.37/1.09 |
| Bristow absorption length, mm | 38 |

EXAMPLE 6

Using the procedures of Example 1, a coating composition was prepared according to the formulation set forth in the following Table X.

TABLE X

| | |
|---|---|
| Calcined Clay Pigment[(1)] | 5 parts |
| FPCC Pigment | 60 parts |
| Kaolin clay Pigment | 30 parts |
| HSP Pigment | 5 parts |
| SBA Emulsion Binder | 8 parts |
| PVA Binder | 3 parts |
| PP Binder[(2)] | 1 part |
| Ethylated Starch | 3 parts |
| Lubricant | 1 part |
| Optical Brightening Agent | 2 parts |
| Thickener | 0.3 part |

In Table X, "Calcined Clay Pigment" is calcine Kaolin clay obtained from Englehard under the tradename Ansilex, "PP Binder" is polyvinyl pyrrolidone obtained from BASF under the tradename PVPK90 and all the other abbreviations are as defined in Example 2.

The coating composition was applied to a 90 gsm base paper having a Gurley Porosity of 30 sec/100 $cm^3$ using a blade coater. Both sides of the paper were coated with a coat weight of 6 gsm per side. The coated roll was super-calendered at the following conditions:

Temperature: 93° C.

Calender load: 30 psi

Number of nips used: 10

Speed: 1,800 feet per minute

The physical properties of the coated and super-calendered papers as determined by the procedures of Example 2 are given in the following Table XI.

TABLE XI

| | |
|---|---|
| Basis weight, gsm | 116 |
| Caliper, mil | 4.43 |
| GE Brightness, % | 93.6/93.5 |
| 75 degree gloss, %, felt/wire | 39.2/39.2 |
| Opacity, % | 94.9 |
| Gurley porosity, sec/100 $cm^3$ | 1,919 |
| Parker smoothness, felt/wire | 1.98/1.67 |
| Bristow absorption length, mm | 144 |

EXAMPLE 7

Using the procedures of Example 1, a coating composition was prepared according to the formulation set forth in the following Table XII.

TABLE XII

| | |
|---|---|
| FPCC Pigment | 60 parts |
| Kaolin Clay Pigment | 30 parts |
| Calcined Clay Pigment | 5 parts |
| HSP Pigment | 5 parts |
| SBA Emulsion Binder | 8 parts |
| PVA Binder | 3 parts |
| Ethylated starch | 3 parts |
| Lubricant | 1 part |
| Optical Brightening Agent | 1 parts |
| Thickener | 0.3 part |

In the Table, all of the abbreviations are as defined in Examples 2 to 6.

The coating composition was applied to a 90 gsm base paper having a Gurley Porosity of 30 sec/100 $cm^3$ using a blade coater. Both sides of the paper were coated with a coat weight of 6 gsm per side. The coated roll was super-calendered at the following conditions:

Temperature: 90° C.

Calender load: 30 psi

Number of nips used: 10

Speed: 1,800 feet per minute

The physical properties of the coated and super-calendered papers as determined by the procedures of Example 2 are set forth in the following Table XIII.

TABLE XIII

| | |
|---|---|
| Basis weight, gsm | 120 |
| Caliper, mil | 4.56 |
| GE Brightness, % | 93.6/93.5 |
| 75 degree gloss, %, felt/wire | 50.9/51.1 |
| Opacity, % | 94.7 |
| Gurley porosity, sec/100 $cm^3$ | 2,509 |
| Parker smoothness, felt/wire | 1.40/1.40 |
| Bristow absorption length, mm | 160 |

EXAMPLE 8

Using the procedures described below, the print density, wicking, dry toner adhesion and wet toner adhesion of the coated papers of Example 1 to 7 were evaluated. In the studies, the color laser printers used were HP Indigo Digital Press 3000, Xerox Phaser 770 and HP 4600. The inkjet printers used in the studies were HP 5550, Epson 777 and Canon i470. For comparison purpose the same properties of two commercial coated printing papers were evaluated.

The physical properties of these papers are set forth in the following Table XVI.

TABLE XIV

| Properties | Commercial 1 | Commercial 2 |
|---|---|---|
| Basis weight, gsm | 120 | 120 |
| Caliper, mil | 4.5 | 4.3 |
| GE Brightness, % | 96 | 90 |
| 75 degree gloss, %, felt/wire | 45 | 66 |
| Opacity, % | 93 | 95 |
| Gurley porosity, sec/100 $cm^3$ | 2,280 | 9,000 |
| Parker smoothness | 1.5 | 1.2 |
| Bristow absorption length, mm | 195 | 203 |

The results of the evaluation are set forth in the following Table XV.

TABLE XV

| Sample | Print Density | Wicking | Dry Toner Adhesion | Liquid Toner Adhesion |
|---|---|---|---|---|
| Commercial 1 | Poor | Poor | Excellent | Poor |
| Commercial 2 | Poor | Poor | Excellent | Poor |
| Example 1 | Good | Good | Excellent | Excellent |
| Example 2 | Good | Good | Excellent | Excellent |
| Example 3 | Good | Good | Excellent | Excellent |
| Example 4 | Good | Good | Excellent | Excellent |
| Example 5 | Good | Good | Excellent | Excellent |
| Example 6 | Good | Good | Excellent | Excellent |
| Example 7 | Good | Good | Excellent | Excellent |

In Table XV, the results of the print density, wicking and toner adhesion tests are indicated by using the following measures:

WICKING:

Poor=Greater than 0.4 mils

Good=from 0.2 to 0.4 mils

Excellent=Less than 0.2 mils

PRINT DENSITY:

Poor=less than 1.0

Good=1.0 to 1.2

Excellent=Greater than 1.2

TONER ADHESION

Poor=less than 90%:

Good=90 to 95%

Excellent =Greater than 99%

Various modifications and variations may be devised given the above-described embodiments of the invention. It is intended that all embodiments and modifications and variations thereof be included within the scope of the invention as it is defined in the following claims.

What is claimed is:

1. A coated paper suitable for multifunctional printing comprising: a paper substrate; and a pigmented composition coated on at least one surface of the substrate, said pigmented coating composition comprising (a) a first pigment having a BET surface area in the range of from 50 to 750 $m^2/g$, (b) a second pigment having a BET surface area in the range of from 5 to 49 $m^2/g$; and (c) a polymeric binder, said coated paper having a coating gloss equal to or greater than 30% at 75° and a Bristow Absorption length of less than 180 mm, wherein said first pigment comprises sub-micron particles of calcium carbonate, sub-micron particles of kaolin, or mixtures thereof; and said second pigment comprises at least one member selected from the group consisting of a calcium carbonate, kaolin, calcined clay, titanium dioxide, plastic pigment, aluminum trihydrate, talc, polytetrafluoroethylene, polyethylene, polypropylene, wax, and polymethylmethacrylate bead.

2. A coated paper according to claim 1 comprising: (a) from 40 to 99 weight % of first pigments based on the total weight of first and second pigments in the coating; (b) from 1 to 60 weight % of the second pigment based on the total amount of first and second pigments in the coating; and (c) from 5 to 40 parts dry basis of polymeric binders based on 100 parts dry basis of pigments.

3. A coated paper according to claim 1 further comprising a lubricant.

4. A coated paper according to claim 1 further comprising a lubricant at an amount ranging from 0.5 to about 2 weight % by weight of the coating.

5. A coated paper according to claim 1 wherein said Bristow Absorption length is less than about 170 mm.

6. A coated paper according to claim 1 wherein said Bristow Absorption length is less than about 160 mm.

7. A coated paper according to claim 6 wherein said Bristow Absorption length is less than about 150 mm.

8. A coated paper according to claim 1 wherein said coating gloss at 75° is from 30% to 80%.

9. A coated paper according to claim 1 wherein said coating gloss at 75° is from 35% to 75%.

10. A coated paper according to claim 1, wherein said coating gloss at 75° is from 40% to 65%.

11. A coated paper according to claim 1 wherein said first pigment has a BET surface area in the range of from 60 to 650 $m^2/g$.

12. A coated paper according to claim 11 wherein said first pigment has a BET surface area in the range of from 70 to 650 $m^2/g$.

13. A coated paper according to claim 12 wherein said first pigment has a BET surface area in the range of from 80 to 650 $m^2/g$.

14. A coated paper according to claim 1 wherein said second pigment has a BET surface area in the range of from 6 to 45 $m^2/g$.

15. A coated paper according to claim 14 wherein said second pigment has a BET surface area in the range of from 6 to 40 $m^2/g$.

16. A coated paper according to claim 15 wherein said second pigment has a BET surface area in the range of from 6 to 35 $m^2/g$.

17. A coated paper according to claim 1 wherein said substrate has a Gurley Porosity equal to or less than 60 sec/100 $cm^3$.

18. A coated paper according to claim 1 wherein said substrate has a Gurley Porosity from 1 sec/100 $cm^3$ to 60 sec/100 $cm^3$.

19. A coated paper according to claim 1 wherein said substrate has a Gurley Porosity from 1 sec/100 $cm^3$ to 50 sec/100 $cm^3$.

20. A coated paper according to claim 1 wherein said substrate has a Gurley Porosity from 1 sec/100 $cm^3$ to 45 sec/100 $cm^3$.

21. A coated paper according to claim 1 wherein said substrate has a Gurley Porosity from 1 sec/100 $cm^3$ to 30 sec/100 $cm^3$.

22. A method of producing a coated paper, comprising (a) preparing an aqueous coating formulation comprising: (i) water, (ii) a first pigment having a BET surface area in the range of from 50 to 700 $m^2/g$ and comprising sub-micron particles of calcium carbonate, sub-micron particles of kaolin, or mixtures thereof; (iii) a second pigment having a BET surface area in the range of from 5 to 49 m2/g; and (3) a polymeric binder; (b) applying the aqueous coating formulation to one or both surfaces of a paper substrate; (c) drying the coated paper; and (d) calendaring the dried coated paper to form a dried calendared paper having a coating gloss equal to or greater than 30% at 75° and a Bristow Absorption length of less than 180 mm.

23. The method according to claim 22, wherein said (b) applying the aqueous coating formulation to one or both surfaces of a paper substrate is performed with a size press.

24. The method according to claim 22, wherein said (d) calendaring of the dried coated paper to form a dried calendared paper is performed at a pressure ranging from about 1000 to about 2000 pounds per linear inch.

25. The method according to claim 22, wherein said (d) calendaring of the dried coated paper to form a dried calendared paper is performed at a temperature ranging from about 150 to about 200°F.

26. A method of generating images on a surface of a coated paper in an inkjet or electrophotographic printing apparatus that comprises: (a) contacting the coated paper according to claim 1 with said apparatus so as to form an image on a surface of said coated paper.

27. The coated paper according to claim 1, wherein the second pigment comprises at least one member selected from the group consisting of a calcium carbonate, kaolin, calcined clay, plastic pigment, polymethylmethacrylate bead, and aluminum trihydrate.

28. The coated paper according to claim 1, wherein the second pigment comprises ground calcium carbonates, precipitated calcium carbonates, or mixtures thereof.

29. The coated paper according to claim 1, wherein said second pigment has a BET surface area in the range of from 6 to 35 $m^2/g$; and wherein said second pigment comprises at least one member selected from the group consisting of a calcium carbonate, kaolin, calcined clay, titanium dioxide, plastic pigment, aluminum trihydrate, talc, polytetrafluoroethylene, polyethylene, polypropylene, wax, and polymethylmethacrylate bead.

30. The coated paper according to claim 1, wherein the polymeric binder comprises at least one member selected from the group consisting of a rubber, latex, styrene butadiene rubber latex, styrene acrylate, polyvinyl alcohol, polyvinyl alcohol copolymer, polyvinyl acetate, polyvinyl acetate copolymers, vinyl acetate copolymer, carboxylated SBR latex, styrene acrylate copolymer, styrene/butadiene/acrylonitrile, styrene/butadiene/acrylate/acrylonilitrile polyvinyl pyrrolidone, styrene/butadiene/acrylate/acrylonitrile polyvinyl pyrrolidone copolymers, polyethylene oxide, poly (2-ethyl-2-oxazoline), polyester resin, gelatin, casein, alginate, cellulose, cellulose derivative, acrylic vinyl polymer, soy protein polymer, hydroxymethyl cellulose, hydroxypropyl cellulose, starch, ethoxylated starch, oxidized starch, enzyme converted starch, cationic starch, water soluble gum, water soluble resin, water-insoluble resin, and polymer latex.

31. The coated paper according to claim 1, further comprising a lubricant wherein the lubricant comprises at least one member selected from the group consisting of a calcium stearate, wax emulsion, paraffin wax, polyethylene wax, soy lecithin, oleic acid, polyethylene glycol, and polypropylene glycol.

32. The coated paper according to claim 1, further comprising a cationic resin.

33. The coated paper according to claim 1, further comprising a cationic resin, wherein the cationic resin comprises at least one member selected from the group consisting of a polydiallyl dimethyl ammonium chloride, polyvinyl benzyl trimethyl ammonium chloride, polymethacryloxyethylhydroxyethyldiammonium chloride, polyvinyl amine, quaternary ammonium polymer, cationic polyethylene imine, copolymer of diallyldimethyl ammonium chloride, copolymer of vinyl pyrrolidone with quaternized diethylaminoethylmethacrylate, cationic polyurethane latex, cationic polyvinyl alcohol, polyalkylamine dicyandiamide copolymers, amine glycidyl addition polymer, and poly[oxethylene(dimethyliminio)ethylene(dimethyliminio)ethylene]dichloride.

34. The coated paper according to claim 1, wherein the first pigment is present at an amount ranging from 40 to 99 wt % based upon the total weight of the first and second pigments and the second pigment is present at an amount ranging from 1 to 60 wt % based upon the total weight of the first and second pigments.

35. The coated paper according to claim 1, wherein the first pigment is present at an amount ranging from 50 to 98 wt % based upon the total weight of the first and second pigments and the second pigment is present at an amount ranging from 2 to 50 wt % based upon the total weight of the first and second pigments.

36. The coated paper according to claim 1, wherein the first pigment is present at an amount ranging from 50 to 90 wt % based upon the total weight of the first and second pigments and the second pigment is present at an amount ranging from 10 to 50 wt % based upon the total weight of the first and second pigments.

* * * * *